United States Patent
Bathori et al.

(10) Patent No.: US 6,821,084 B2
(45) Date of Patent: Nov. 23, 2004

(54) TORQUE TUBE BEARING ASSEMBLY

(75) Inventors: Julius Bathori, Cincinnati, OH (US); Sang Yeng Park, West Chester, OH (US); Mitchell Jay Headley, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 123 days.

(21) Appl. No.: 10/316,778

(22) Filed: Dec. 11, 2002

(65) Prior Publication Data

US 2004/0115040 A1 Jun. 17, 2004

(51) Int. Cl.[7] .............................................. F01D 11/08
(52) U.S. Cl. ................................... 415/160; 415/173.2
(58) Field of Search ............................ 415/160, 173.1, 415/173.2, 173.3, 123, 149, 150, 174.2, 126

(56) References Cited

U.S. PATENT DOCUMENTS

| | | | |
|---|---|---|---|
| 3,314,595 A | 4/1967 | Burge et al. | |
| 3,719,427 A | 3/1973 | Davis | |
| 3,779,665 A | * 12/1973 | Tatem et al. | ................ 415/123 |
| 4,430,043 A | 2/1984 | Knight et al. | |
| 4,755,104 A | 7/1988 | Castro et al. | |
| 5,190,439 A | 3/1993 | Das | |
| 5,228,828 A | * 7/1993 | Damlis et al. | ........... 415/173.2 |
| 5,549,448 A | 8/1996 | Langston | |
| 5,993,152 A | 11/1999 | Schilling | |
| 6,471,471 B1 | 10/2002 | Bouyer | |

\* cited by examiner

*Primary Examiner*—Edward K. Look
*Assistant Examiner*—J. M. McAleenan
(74) *Attorney, Agent, or Firm*—Nate Herkamp; Sonnenschein Nath & Rosenthal LLP

(57) ABSTRACT

A bearing assembly for use in a gas turbine engine to rotatably mount a torque tube in an access hole extending through a fan duct. The torque tube connects a variable stator vane bell crank positioned inside the fan duct to an actuator positioned outside the fan duct. The bearing assembly includes a bearing having a spherical external engagement surface and a housing having a flange and an annular interior surface having an inner edge and an outer edge. The interior surface is sized and shaped for rotatably receiving the spherical external engagement surface of the bearing so the spherical engagement surface and the annular interior surface make contact along an annular contact area centered on a contact plane lying between the inner and outer edges. The contact plane is tilted with respect to the flange at an angle greater than five degrees.

19 Claims, 3 Drawing Sheets

TORQUE TUBE BEARING ASSEMBLY

This invention was made with government support under grants from the U.S. Department of Defense (F33657-99-D-2050 EPD Z123D12). The U.S. government has certain rights in this invention.

BACKGROUND OF THE INVENTION

The present invention relates generally to a gas turbine engine variable stator vane torque tube assembly and, more particularly, to a torque tube assembly having improved bearing life.

Variable pitch stator vanes are commonly used in compressors of gas turbine engines. The variable pitch stator vanes or, more simply, variable stator vanes are pivotably mounted in axially spaced rows inside a compressor case of the engine. Each of the vanes pivots on a spindle having an axis extending radially with respect to an engine centerline to vary the pitch of the vane. Levers on the outboard ends of the spindles simultaneously pivot each of the vanes in a row. The levers form part of a bell crank mechanism mounted outside the compressor case. Some engines include a torque tube assembly operatively connecting the bell crank mechanism to a variable stator vane actuator mounted outside a fan duct surrounding the compressor case. The torque tube assembly includes an elongate torque tube extending through an access hole in the fan duct from the bell crank mechanism to the actuator.

During operation, the elongate torque tube rotates in the access hole about a longitudinal axis of the tube extending generally radially relative to the engine centerline from the bell crank mechanism to the actuator. Because the compressor case and the fan duct operate at significantly different temperatures, the relative axial positions of the compressor case and the fan duct change during engine operation. As a result, the outboard end of the torque tube tilts rearward as the engine heats up during engine operation. Thus, the torque tube must be free to tilt and rotate in the access hole. To facilitate this motion, a spherical bearing assembly is positioned between the torque tube and the access hole. The bearing assembly includes a spherical bearing mounted on the torque tube and a housing adapted for receiving the bearing mounted over the access hole on the fan duct.

Some conventional variable stator vane torque tube assemblies have housings tilted to match the calculated torque tube tilt angle during engine operation. FIG. 1 illustrates a cross section of a bearing assembly used in one such conventional variable stator vane torque tube assembly. This bearing assembly includes a housing tilted at an angle of less than about four degrees. However, in some instances torque tubes tilt rearward by as much as thirteen degrees or more during steady state engine operation. The resulting asymmetric loading developed in the bearing assembly during engine operation when the torque tube is disposed at an angle with respect to the housing has sometimes resulted in premature bearing assembly failure. Accordingly, there is a need for a torque tube assembly with a bearing that performs more reliably and has improved life under such operating conditions.

SUMMARY OF THE INVENTION

Briefly, the present invention includes a bearing assembly for use in a gas turbine engine to rotatably mount a torque tube in an access hole extending through a fan duct of the engine. The torque tube connects a variable stator vane bell crank positioned inside the fan duct to an actuator positioned outside the fan duct. The bearing assembly comprises a bearing adapted for mounting on the torque tube having a spherical external engagement surface. Further, the assembly comprises a housing having a flange adapted for mounting on the fan duct adjacent the access hole and an annular interior surface having an inner edge and an outer edge. The interior surface is sized and shaped for rotatably receiving the spherical external engagement surface of the bearing so the spherical engagement surface and the annular interior surface make contact along an annular contact area centered on a contact plane lying between the inner edge and the outer edge of the interior surface. The contact plane is tilted with respect to the flange at an angle greater than five degrees.

In another aspect, the invention includes a torque tube assembly for use in a gas turbine engine to connect a variable stator vane bell crank positioned inside a fan duct of the engine to a variable stator vane actuator positioned outside the fan duct. The torque tube assembly comprises an elongate torque tube having an inner end adapted for connection to the variable stator vane bell crank, an outer end adapted for connection to the variable stator vane actuator, and a longitudinal axis extending between the inner end and the outer end. Further, the assembly comprises a bearing mounted on the torque tube having a spherical external engagement surface and a housing having a flange adapted for mounting to the fan duct and an annular interior surface having an inner edge and an outer edge. The interior surface is sized and shaped for rotatably receiving the spherical external engagement surface of the bearing so that when the spherical engagement surface and the annular interior surface make contact along an annular contact area centered on a contact plane extending parallel to the outer edge of the interior surface of the housing, the torque tube axis extends at an angle of less than 85° from the flange.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 2:
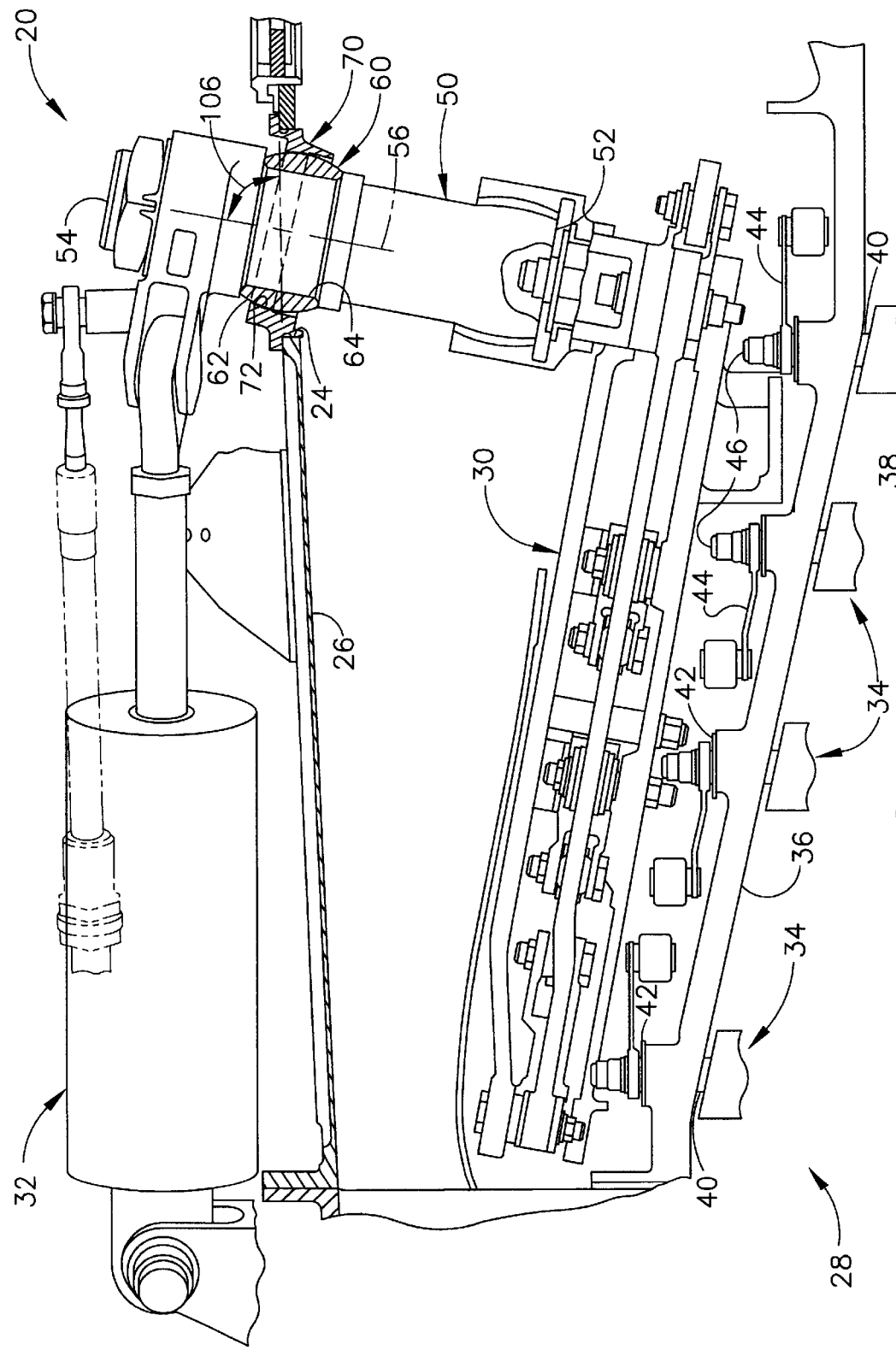
FIG. 2 is a section of a portion of a gas turbine engine showing a torque tube bearing assembly of the present invention.

Referring now to the drawings and in particular to FIG. 2, a torque tube assembly for use in a gas turbine engine is designated in its entirety by the reference numeral 20. The assembly 20 extends through an access hole 24 in a fan duct 26 of the gas turbine engine (generally designated by 28) and connects a variable stator vane bell crank (generally designated by 30) positioned inside the fan duct to an actuator (generally designated by 32) positioned outside the fan duct. The torque tube assembly 20 transmits torque from the actuator 32 to the bell crank 30 to vary the pitch of stator vanes 34 connected to the bell crank. The vanes, generally designated by 34, are mounted inside a compressor case 36 of the engine 28. The vanes 34 direct air passing through a flowpath 38 of the engine 28 inside the compressor case 36.

Each of the vanes 34 includes a spindle 40 extending through a bushing 42 mounted on the compressor case 36. A lever 44 forming part of the bell crank 30 is mounted on an outboard end 46 of each spindle 40. The levers 44 provide leverage to pivot the vanes 34 about their respective spindles 40 to vary their pitch or angle of attack with respect to the air flowing through the flowpath 38 of the engine 28.

Figure 1:
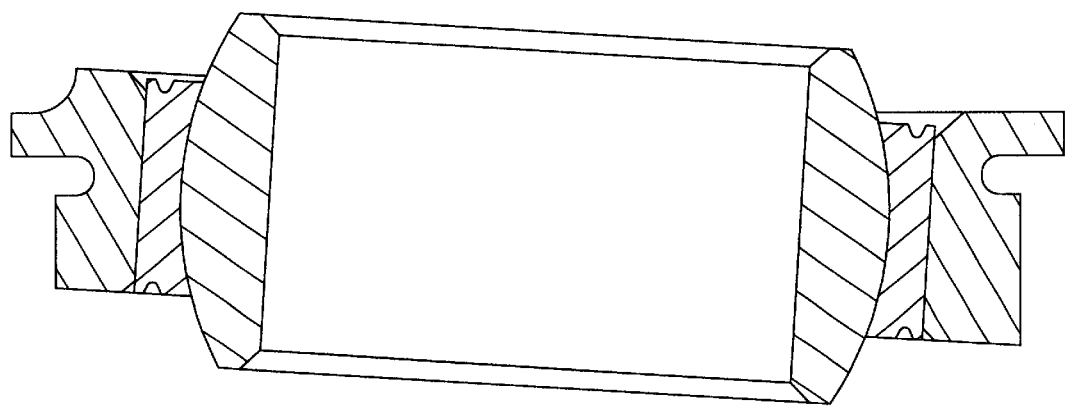
FIG. 1 is a cross section of a prior art bearing assembly.
Figure 3:
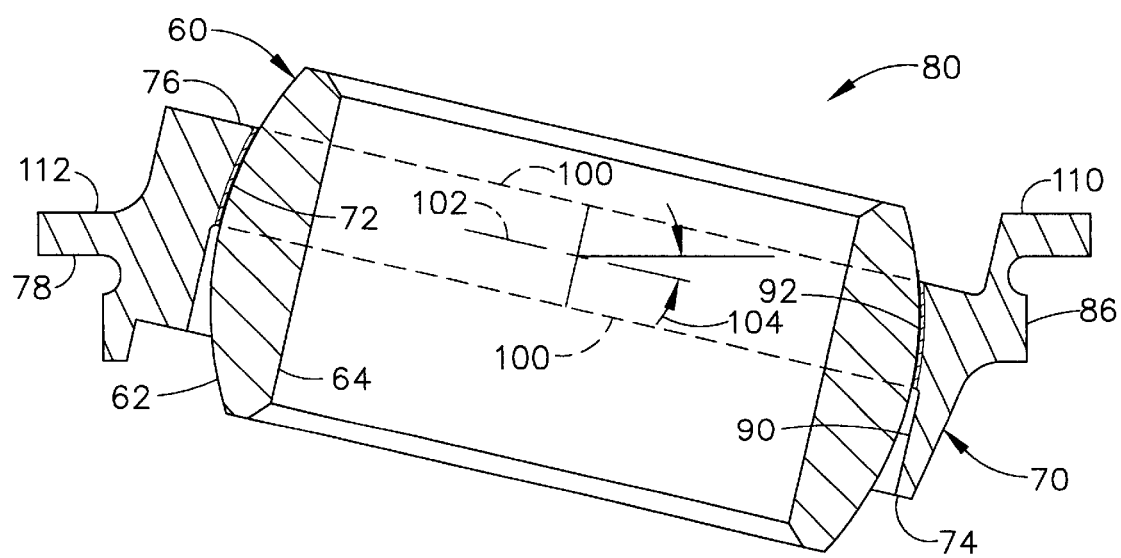
FIG. 3 is a cross section of a bearing assembly of the present invention.

As further illustrated in FIG. 2, the torque tube assembly 20 comprises a conventional elongate torque tube, generally designated by 50, having an inner end 52 adapted for connection to the variable stator vane bell crank 30, an outer end 54 adapted for connection to the variable stator vane actuator 32, and an imaginary longitudinal axis 56 extending between the inner and outer ends. The features of the torque tube are conventional and will not be discussed in detail. A bearing, generally designated by 60, is mounted on the torque tube 50. The bearing 60 has a spherical external engagement surface 62 and an internal bore 64 adapted for receiving the torque tube 50. Although the bearing 60 may be mounted on the torque tube 50 in other ways without departing from the scope of the present invention, in one embodiment the internal bore 64 is sized for a close clearance fit with the torque tube so the bearing and torque tube move as a unit. The torque tube assembly 20 also includes a housing, generally designated by 70, having an annular interior surface 72 adapted for rotatably receiving the spherical external engagement surface 62 of the bearing 60. As illustrated in FIG. 3, the annular interior surface 72 has an inner edge 74 and an outer edge 76. Together the bearing 60 and housing 70 form a bearing assembly, generally designated by 80, for mounting the torque tube 50 in the access hole 24 of the fan duct 26. The bearing assembly 80 permits the torque tube 50 to rotate about its longitudinal axis 56 to pivot the vanes 34, as well as tilt within the access hole 24 of the fan duct 26 to compensate for differences in thermal growth between the compressor case 36 and fan duct 26 during engine 28 operation.

Figure 4:
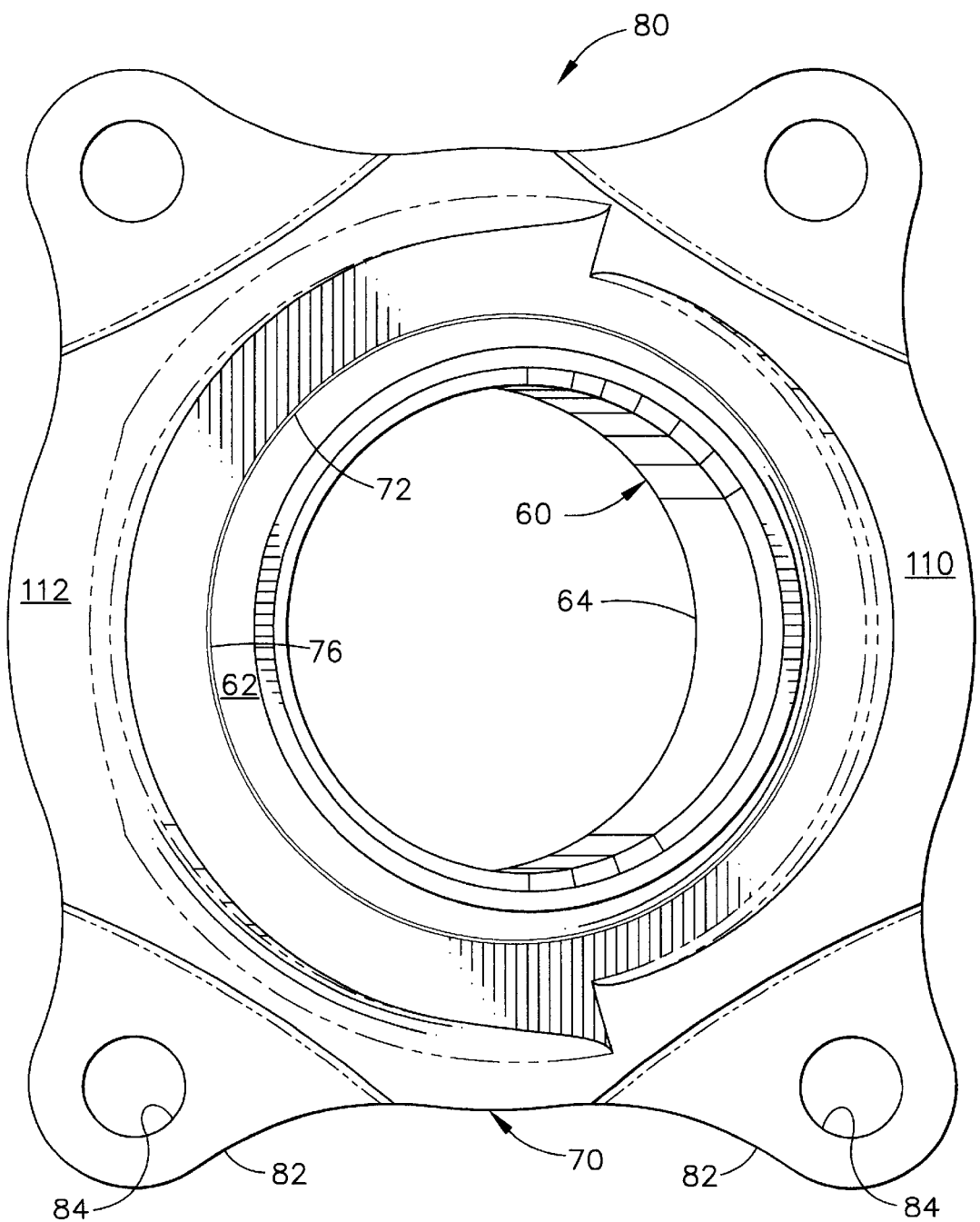
FIG. 4 is a top plan of the bearing assembly of the present invention.

As illustrated in FIG. 3, the housing 70 has a flange 82 adapted for mounting the housing to the fan duct 26 so the annular interior surface 72 of the housing is aligned with the access hole 24 in the fan duct. In one embodiment, the flange 82 is constructed integrally with the housing 70. As illustrated in FIG. 4, the flange 82 includes a plurality of holes 84 for attaching the housing 70 to the fan duct 26 with bolts (not shown) or other fasteners. As shown in FIG. 3, the housing 70 also has an annular rabbet surface 86 for engaging the access hole 24 when the flange 82 is mounted on the fan duct 26 to properly position the bearing assembly 80 on the fan duct. In one embodiment, the annular interior surface 72 of the housing 70 includes a relieved portion 90 for loading the bearing 60 into the housing 70. The relieved portion 90 faces inward when the flange 82 of the housing 70 is mounted on the fan duct 26 so the bearing 60 loads outward against an uninterrupted portion 92 of the interior surface 72 of the housing.

As will be appreciated by those skilled in the art, the spherical external engagement surface 62 of the bearing 60 and the annular interior surface 72 of the housing 70 make contact along an annular contact area (the outer and inner boundaries of which are designated by dashed lines 100) centered on a contact plane 102 lying between the inner edge 74 and the outer edge 76 of the interior surface 72. The contact plane 102 is tilted with respect to the flange 82 at an angle 104 greater than five degrees. This arrangement results in the torque tube axis 56 extending at an angle 106 (FIG. 2) measured from the flange of less than 85 degrees when the tube 50 is tilted so the tube is centered with respect to the inner and outer edges 74, 76 of the interior surface 72 of the housing 70. In one embodiment, the angle 104 at which the contact plane 102 tilts is greater than about ten degrees resulting in an angle 106 of less than about eighty degrees. In another embodiment, the angle 104 at which the contact plane 102 tilts is about thirteen degrees resulting in an angle 106 of about 77 degrees. In still another embodiment, the angle 104 is about 13.08 degrees. As will be appreciated by those skilled in the art, the angle 106 is optimally the angle at which the torque tube 50 passes through the access hole 24 during a steady state power setting of the engine. For example, if the engine 28 is an aircraft engine, the angle 106 is the angle at which the torque tube 50 passes through the access hole 24 during steady state cruise operation of the engine. Further, in one embodiment the outer end 54 of the torque tube 50 is positioned behind the inner end 52 of the torque tube during the steady state power setting of the engine 28. In addition, the torque tube axis 56 may be substantially radial when the engine 28 is cold to enhance engine assembly. Those skilled in the art will appreciate the angles 104, 106 result in the torque tube axis 56 extending perpendicular to the outside edge 76 of the interior surface 72 of the housing 70 during at least one steady state power setting of the engine 28 (e.g., during steady state cruise operation of an aircraft engine). This arrangement also results in a rearward side 110 of the housing flange 82 being positioned outboard from the outer edge 76 of the interior surface 72 of the housing 70 when the flange is mounted on the fan duct 26 and a forward side 112 of the housing flange being positioned inboard from at least a portion of the interior surface of the housing when the flange is mounted on the fan duct.

Each of the previously described components of the torque tube assembly 20 may be constructed from materials conventionally used to construct torque tube assemblies. Although the housing 70 may be made of other materials without departing from the scope of the present invention, in one embodiment the housing is made from stainless steel. A portion of the interior surface 72 of the housing 70 (e.g., the spherical portion 90 of the interior surface) may be coated with a protective coating and/or a friction reducing coating to reduce wear. Although the bearing 60 may be made of other materials without departing from the scope of the present invention, in one embodiment the bearing is made from stainless steel.

As will be appreciated by those skilled in the art, the torque tube assembly 20 operates conventionally. As the actuator 32 extends and retracts, the torque tube 50 rotates about its longitudinal axis 56 within the access hole 24 of the fan duct 26 to drive the bell crank 30 and thereby vary the pitch of the stator vanes 34 inside the compressor case 36. Further, the bearing assembly 80 permits the torque tube to tilt to compensate for differences in thermal growth between the fan duct 26 and the compressor case 36. The torque tube assembly 20 of the present invention has improved load distribution on the bearing 60 and housing 70 during engine operation. This results in improved life and improved performance of the bearing assembly 80 consequently improving the life and performance of torque tube assembly 20 and the gas turbine engine.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A bearing assembly for use in a gas turbine engine to rotatably mount a torque tube in an access hole extending through a fan duct of the engine, said torque tube connecting a variable stator vane bell crank positioned inside the fan duct to an actuator positioned outside the fan duct, said bearing assembly comprising:
    a bearing adapted for mounting on the torque tube having a spherical external engagement surface; and
    a housing having a flange adapted for mounting on the fan duct adjacent the access hole and an annular interior surface having an inner edge and an outer edge, said interior surface being sized and shaped for rotatably receiving the spherical external engagement surface of the bearing so the spherical engagement surface and the annular interior surface make contact along an annular contact area centered on a contact plane lying between said inner edge and said outer edge of the interior surface, said contact plane being tilted with respect to the flange at an angle greater than five degrees.

2. A bearing assembly as set forth in claim 1 wherein the angle at which the contact plane tilts is greater than about ten degrees.

3. A bearing assembly as set forth in claim 2 wherein the angle at which the contact plane tilts is about thirteen degrees.

4. A bearing assembly as set forth in claim 3 wherein the angle at which the contact plane tilts is about 13.08 degrees.

5. A bearing assembly as set forth in claim 1 wherein the annular interior surface of the housing includes a relieved portion for loading the bearing into the housing.

6. A bearing assembly as set forth in claim 5 wherein the relieved portion faces inward when the flange of the housing is mounted on the fan duct.

7. A bearing assembly as set forth in claim 1 wherein the housing includes a rabbet surface for engaging the access hole when the flange is mounted on the fan duct.

8. A bearing assembly as set forth in claim 1 wherein a portion of the housing flange is positioned outside the interior surface of the housing when the flange is mounted on the fan duct and a portion of the housing flange is positioned inside the interior surface of the housing when the flange is mounted on the fan duct.

9. A bearing assembly as set forth in claim 8 wherein the portion of the housing flange positioned outside the interior surface of the housing includes a rearward side of the housing flange and the portion of the housing flange positioned inside the interior surface of the housing includes a forward side of the housing flange.

10. A torque tube assembly for use in a gas turbine engine to connect a variable stator vane bell crank positioned inside a fan duct of the engine to of a variable stator vane actuator positioned outside the fan duct, said torque tube assembly comprising:
    an elongate torque tube having an inner end adapted for connection to the variable stator vane bell crank, an outer end adapted for connection to the variable stator vane actuator, and a longitudinal axis extending between said inner end and said outer end;
    a bearing mounted on the torque tube having a spherical external engagement surface; and
    a housing having a flange adapted for mounting to the fan duct and an annular interior surface having an inner edge and an outer edge, said interior surface being sized and shaped for rotatably receiving the spherical external engagement surface of the bearing so that when the spherical engagement surface and the annular interior surface make contact along an annular contact area centered on a contact plane extending parallel to the outside edge of the interior surface of the housing, the torque tube axis extends at an angle measured from the flange of less than 85 degrees.

11. A torque tube assembly as set forth in claim 10 wherein the angle at which the torque tube axis extends is less than about eighty degrees.

12. A torque tube assembly as set forth in claim 11 wherein the angle at which the torque tube axis extends is about 77 degrees.

13. A torque tube assembly as set forth in claim 10 wherein the torque tube axis extends perpendicular to the outside edge of the interior surface of the housing during at least one steady state power setting of the engine.

14. A torque tube assembly as set forth in claim 13 wherein the torque tube assembly is adapted for use in an aircraft engine and the torque tube axis extends perpendicular to the outside edge of the interior surface of the housing during steady state cruise operation of the engine.

15. A torque tube assembly as set forth in claim 13 wherein the outer end of the torque tube is positioned behind the inner end of the torque tube during said steady state power setting of the engine.

16. A torque tube assembly as set forth in claim 10 wherein the annular interior surface of the housing includes a relieved portion for loading the bearing into the housing.

17. A torque tube assembly as set forth in claim 10 wherein the relieved portion faces inward when the flange of the housing is mounted on the fan duct.

18. A torque tube assembly as set forth in claim 10 wherein the housing includes an annular rabbet surface adjacent the flange for positioning housing assembly on the fan duct.

19. A torque tube assembly as set forth in claim 10 in combination with the gas turbine engine.

\* \* \* \* \*